US 8,295,305 B2

(12) United States Patent
Basso et al.

(10) Patent No.: US 8,295,305 B2
(45) Date of Patent: Oct. 23, 2012

(54) DUAL SCHEDULING OF WORK FROM MULTIPLE SOURCES TO MULTIPLE SINKS USING SOURCE AND SINK ATTRIBUTES TO ACHIEVE FAIRNESS AND PROCESSING EFFICIENCY

(75) Inventors: Claude Basso, Raleigh, NC (US); Jean L. Calvignac, Raleigh, NC (US); Chih-Jen Chang, Apex, NC (US); Hubertus Franke, Cortlandt Manor, NY (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/650,174

(22) Filed: Dec. 30, 2009

(65) Prior Publication Data

US 2011/0158254 A1    Jun. 30, 2011

(51) Int. Cl.
*H04J 3/22* (2006.01)
(52) U.S. Cl. ...................................... 370/468
(58) Field of Classification Search ............... 370/395.4, 370/395.41, 395.42, 468; 718/102–105
See application file for complete search history.

(56) References Cited

U.S. PATENT DOCUMENTS

| | | | |
|---|---|---|---|
| 5,850,399 A | 12/1998 | Ganmukhi et al. | |
| 6,282,583 B1 | 8/2001 | Pincus et al. | |
| 6,549,930 B1 * | 4/2003 | Chrysos et al. | 718/104 |
| 6,606,326 B1 | 8/2003 | Herring | |
| 6,836,808 B2 | 12/2004 | Bunce et al. | |
| 7,248,585 B2 | 7/2007 | Kohn et al. | |
| 7,290,105 B1 | 10/2007 | Jeter, Jr. et al. | |
| 7,304,944 B2 | 12/2007 | Bitar et al. | |
| 7,334,086 B2 | 2/2008 | Hass et al. | |
| 7,415,540 B2 * | 8/2008 | Fallon et al. | 709/250 |
| 7,425,540 B2 | 9/2008 | Salter et al. | |
| 7,461,213 B2 | 12/2008 | Hass et al. | |
| 7,483,377 B2 | 1/2009 | Szumilas | |
| 7,508,764 B2 | 3/2009 | Back et al. | |
| 7,526,593 B2 | 4/2009 | Mandal et al. | |
| 7,646,779 B2 | 1/2010 | Kumar et al. | |
| 8,060,857 B2 | 11/2011 | Biggerstaff | |
| 8,108,844 B2 | 1/2012 | Crutchfield et al. | |
| 2005/0047425 A1 | 3/2005 | Liu et al. | |
| 2005/0243853 A1 | 11/2005 | Bitar et al. | |
| 2006/0140201 A1 | 6/2006 | Kumar et al. | |
| 2007/0294512 A1 | 12/2007 | Crutchfield et al. | |

(Continued)

OTHER PUBLICATIONS

U.S. Appl. No. 12/650,120, filed Dec. 30, 2009, Basso et al.

(Continued)

*Primary Examiner* — Frank Duong
(74) *Attorney, Agent, or Firm* — Yee & Associates, P.C.; Jennifer Davis

(57) ABSTRACT

Assigning work, such as data packets, from a plurality of sources, such as data queues in a network processing device, to a plurality of sinks, such as processor threads in the network processing device is provided. In a given processing period, a source is selected in a manner that maintains fairness in the selection process. A corresponding sink is selected for the selected source based on processing efficiency. If, due to assignment constraints, no sink is available for the selected source, the selected source is retained for selection in the next scheduling period, to maintain fairness. In this case, to optimize efficiency, a most efficient currently available sink is identified and a source for providing work to that sink is selected.

20 Claims, 4 Drawing Sheets

U.S. PATENT DOCUMENTS

2001/0158250    6/2011   Basso et al.
2011/0158249 A1    6/2011   Basso et al.

OTHER PUBLICATIONS

U.S. Appl. No. 12/650,080, filed Dec. 30, 2009, Basso et al.
IBM, "Adding Non-Realtime Scheduler Function to Any Realtime Operating System"; IP.COM-IBM TDB; Mar. 15, 2002, pp. 1-3.
Ungerer et al.; "A Survey of Processors with Explicit Multithreading"; ACM Digital Library; vol. 35, No. 1, pp. 29-63; Mar. 2003.
Paulin et al.; "Application of a Multi-Processor SoC Platform to High-Speed Packet Forwarding"; ACM/IEEE; Proceedings of the Design, Automation and Test in Europe Conference and Exhibition Designers' Forum, pp. 1530-1591; 2004.
Lopez-Benitez et al.; "Real-Time HSPA Emulator for End-to-Edge QoS Evaluation in All-IP 3G Heterogeneous Wireless Networks"; ACM; QoSim 2008, Marseille France, Mar. 2008, pp. 1-12.
Luo et al., "Conserving Network Processor Power Consumption by Exploiting Traffic Variability", ACM Digital Library, vol. 4; No. 1, Art 4, Mar. 2007, pp. 1-26.
Krishna et al., "On the Speedup Required for Work-Conserving Crossbar Switches", 1999 IEEE Journal on Selected Areas of Communications, vol. 17, No. 6, Jun. 1999, pp. 1057-1066.
Office Action regarding U.S. Appl. No. 12/650,080 dated May 25, 2012, 30 pages.
Office Action regarding U.S. Appl. No. 12/650,120, dated May 29, 2012, 19 pages.

* cited by examiner

DUAL SCHEDULING OF WORK FROM MULTIPLE SOURCES TO MULTIPLE SINKS USING SOURCE AND SINK ATTRIBUTES TO ACHIEVE FAIRNESS AND PROCESSING EFFICIENCY

The present application is related to U.S. patent application Ser. No. 12/650,120, entitled "Assigning Work from Multiple Sources to Multiple Sinks"; and U.S. patent application Ser. No. 12/650,080, entitled "Assignment Constraint Matrix for Assigning Work from Multiple Sources to Multiple Sinks"; both filed on even date herewith and assigned to the assignee of the present application, the details of which are incorporated herein by reference.

BACKGROUND

1. Field:

The disclosure relates generally to systems for processing data from multiple sources by multiple processors, such as network processing devices, and more specifically to systems and methods for assigning work in the form of data packets from multiple data queue sources to multiple processing thread sinks using source attributes and sink attributes to achieve both assignment fairness and processing efficiency.

2. Description of the Related Art:

Network processing devices, such as routers, switches and intelligent network adapters, are comprised of a network component, which receives incoming data traffic, and a finite set of processing elements, that are employed to process the incoming data. Network processing devices routinely partition incoming traffic into different segments for the purpose of providing network segment specific quality of service (QoS). Examples of quality of service parameters are bandwidth limitation enforcement on one particular segment or bandwidth weighting and/or prioritization across all segments. It is commonplace to associate a queue with each segment into which incoming data is divided. Incoming data packets are placed into the queue of their associated segment as they are received.

A queue scheduler is used to determine an order in which the queues are to be served by the device processing elements. For example, the queue scheduler may determine the next queue that is to be served. The next in line data packet, or other work item, from the selected queue is then placed into a single service queue. The processing elements retrieve data packets from the single service queue to provide the required processing for the retrieved data packet. It is commonplace to use polling or other interrupts to notify one or more of the processing elements when data packets are available for retrieval from the single service queue for processing.

Increasingly, the processing elements are comprised of multiple compute cores or processing units. Each core may be comprised of multiple hardware threads sharing the resources of the core. Each thread may be independently capable of processing incoming data packets. Using a conventional queue scheduler, only one thread at a time can get data from the single service queue.

Network processing system software increasingly desires to constrain which threads can service which queues in order to create locality of work. A conventional queue scheduler polls the status of all queues to determine the next best suited queue to process without reference to such constraints.

As the number of data queues increases, the time required in order to make a scheduling decision, also known as the scheduling period, also increases. For example, a device that is to support 100 Gbps network traffic comprised of small 64 byte packets needs to support a throughput of roughly 200 million packets per second. On a 2 GHz system, this implies that a scheduling decision needs to be accomplished in less than 10 clock cycles. In conventional queue schedulers, queues are attached to a queue inspection set, often referred to as a ring, when queue status is changed from empty to not-empty. Similarly, queues are detached from the queue inspection set when queue status is changed from not-empty to empty. Use of a queue inspection set limits the number of queues that need to be examined by the queue scheduler during a scheduling period, since the queue scheduler need only examine queues having data to be processed, and these are the not-empty queues attached to the queue inspection set.

SUMMARY

A method and apparatus for scheduling work from a plurality of sources to a plurality of sinks using source attributes and sink attributes to achieve assignment fairness and processing efficiency is disclosed. In an illustrative embodiment, the plurality of sources are data queues, such as data queues in a network processing device, the work is data packets on the data queues and awaiting processing, and the sinks are processing threads, such as threads on a plurality of processor cores of the networking processing device.

In a given scheduling period, a first source from the plurality of sources is selected based on a source attribute, such as a source attribute that is selected to maintain source selection fairness. Based on any assignment constraints between the plurality of sources and the plurality of sinks, it is determined whether a sink is available for work from the first source. When a sink is available for the first source, a first sink is selected for the first source based on a sink attribute, such as a sink attribute related to processing efficiency.

When a sink is not available for the first source, to maintain fairness, the first source is retained for selection as the first source in the next scheduling period. In this case, to optimize efficiency, a second sink is selected from the plurality of sinks based on sink attributes, such as sink attributes related to processing efficiency. A second source to provide work for processing by the second sink is selected based on any assignment constraints and source attributes, such as source attributes related to source selection fairness.

In accordance with an illustrative embodiment, the first source is selected by a basic scheduler that stays on the first source but defers to a complement scheduler when a sink is not currently available for the first source. The complement scheduler selects the second source and the second sink. The basic and complement schedulers may operate simultaneously and in parallel.

Further objects, features, and advantages will be apparent from the following detailed description and with reference to the accompanying drawings.

DETAILED DESCRIPTION

Figure 1:
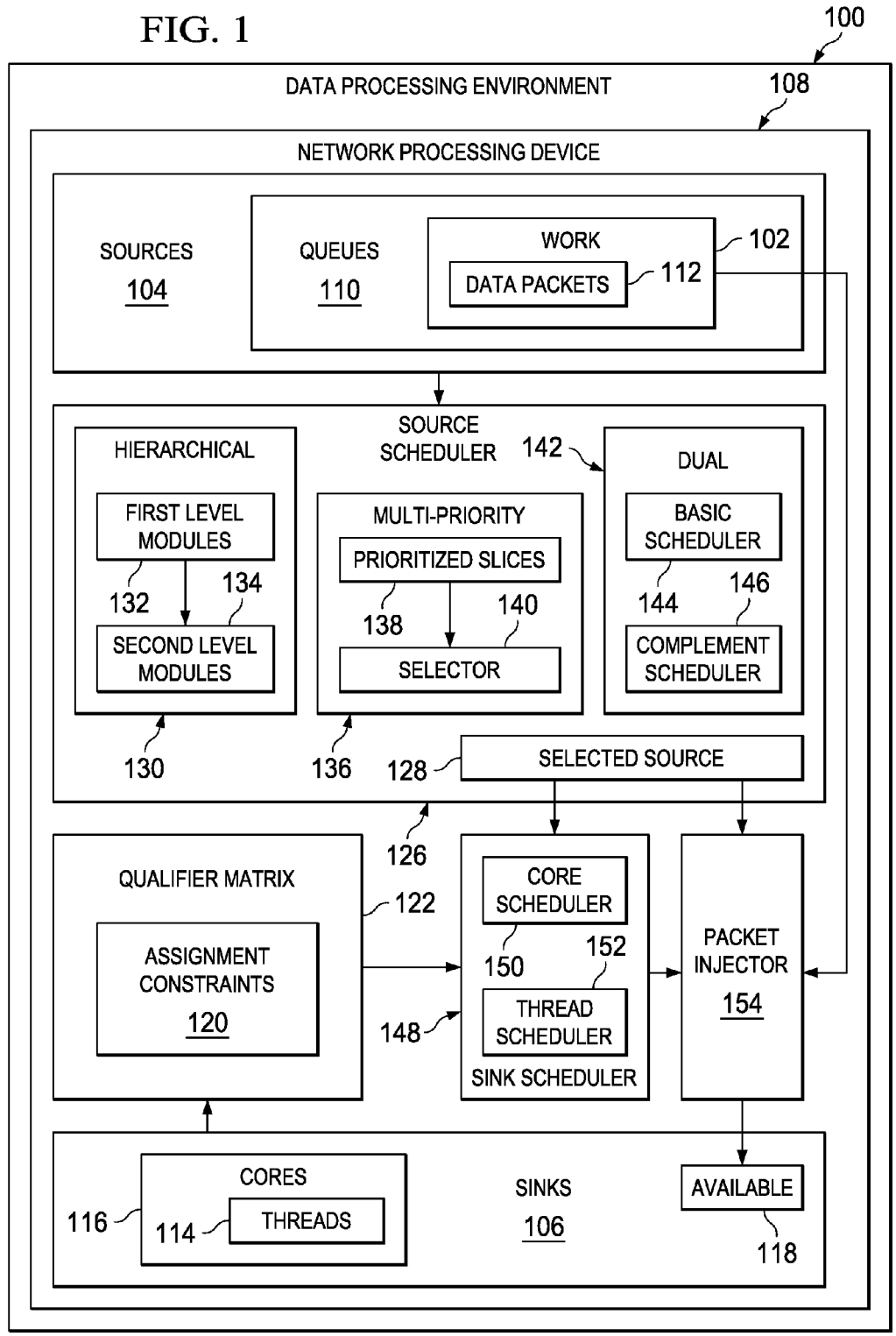
FIG. 1 is a functional block diagram of a system incorporating an apparatus and method for assigning work from multiple sources to multiple sinks using a dual scheduler to achieve assignment fairness and processing efficiency in accordance with an illustrative embodiment.

A method and apparatus for scheduling work from multiple sources to multiple sinks using source attributes and sink attributes to achieve assignment fairness and processing efficiency is disclosed. Illustrative embodiments will be described in detail herein with reference to the example of application in network processing devices in which the multiple sources are multiple data queues, the multiple sinks are multiple threads, and the work is in the form of data packets that are to be assigned from the data queues to the threads for processing. It should be understood that other embodiments may be implemented in other applications for matching types of work that are different from those described by example herein from a plurality of sources that are different from those described by example herein to a plurality of sinks that are different from those described by example herein.

The different illustrative embodiments recognize and take into account a number of different considerations. For example, the different illustrative embodiments recognize and take into account that as the number of cores and threads in network processing devices increases, the assignment of work, in the form of data packets, to threads for processing via a single service queue, as employed in conventional queue scheduling, becomes problematic. The scalability of conventional methods for assigning data packets to cores is limited due to contention on the single service queue.

Furthermore, the different illustrative embodiments recognize and take into account that conventional queue scheduling is not adapted to respond effectively to constraints on which threads can service which queues. Such constraints can cause problems that unnecessarily limit system performance in systems where conventional queue scheduling is employed. A conventional queue scheduler polls the status of all queues to determine the next best suited queue to process without reference to such constraints. A constraint imposed by a thread to queue assignment may prevent data from the selected queue from being dispatched to a thread for processing if all of the threads assigned to that queue are busy. At the same time, other threads, that might be servicing other queues, may remain idle waiting for the data from the selected queue to be cleared from the single service queue so that another queue may be selected for processing. This condition violates the fundamental requirement of work conservation. Work conservation is defined as the property of a data processing system that no resources shall be idle while there still is work to be done. In this case, processing cores/threads that could be processing data packets are idle while data packets to be processed remain in the queues.

The different illustrative embodiments recognize and take into account that queue scheduling in a high speed networking environment, such as 10 Gbps, 40 Gbps, or up to 100 Gbps networks, poses a challenge where a high number of queues need to be processed in the limited cycle budget. In addition, the high clock frequency required for the high speed networking environment also limits the number of queues that can be processed in each clock cycle. In a queue scheduler all queues need to be inspected for data to be processed. Electrical propagation delays associated with this inspection put a limit on the number of queues that can be inspected.

The different illustrative embodiments recognize and take into account that conventional methods for dealing with increases in the number of data queues to be serviced by processing threads by using queue inspection sets to reduce the time required to make a scheduling decision cannot be applied effectively to the case where there are constraints on which threads can service which queues. Application of queue inspection sets in the context of such constraints would imply associating a queue inspection set or inspection ring with each thread or other sink. However, this approach becomes infeasible due to the fact that multiple attach/detach operations, one for each thread or other sink that is eligible for a particular queue, at each queue status change would not be able to be accomplished in the time constraints set by the scheduling interval.

The different illustrative embodiments recognize and take into account that it is also desirable to provide a form of load balancing of packet processing over cores in a multiple core system. Load balancing preferably is implemented such that roughly the same number of threads are active on each core. Conventional queue scheduling does not support such load balancing.

The different illustrative embodiments also recognize and take into account that when a cluster of dedicated source queues is handled by a cluster of dedicated sink threads, without any overlap of the different types of data traffic between queues and threads, it is possible to schedule the source queues with fairness by placing the queues in each cluster on a ring served by the corresponding cluster of threads, or by other simple methods of providing fairness of scheduling among the different traffic types. However, when any combination of affinity between source queues and sink threads is possible, that is, when multiple data types from multiple sources may be processed by multiple overlapping sets of sinks, such fairness is much more difficult to provide. Furthermore, in such a case, where a given source queue can be served by multiple different sink threads, given a source queue selected to be processed in a given scheduling period, a sink thread to process the work from the selected queue must also be selected. The thread may be selected from among those threads with the best processing capability, such as threads belonging to less loaded cores and/or more efficient cores, such as cores having larger caches, etc. But such a selection can completely undermine fairness at the system level, leading to some data traffic on some source queues never being served.

The illustrative embodiments disclose a method and apparatus that provides a solution for scheduling work from multiple sources to multiple sinks with optimum efficiency at the system level, e.g., by giving priority to less loaded sinks at a given time, while solving the problem of unfairness that may arise when such priority is given to less loaded processing sinks. The illustrative embodiments provide a scheduling solution that can be implemented for very high packet traffic throughput, e.g., 100G Ethernet, with any type of affinity between traffic queues and threads.

As illustrated in FIG. 1, an apparatus or method in accordance with an illustrative embodiment may find application in any data processing environment 100 in which work 102 from multiple sources 104 is to be directed to multiple sinks 106 for processing. In a particular illustrative embodiment, an apparatus or method in accordance with an illustrative embodiment is adapted for use in data processing environment 100 such as network processing device 108. Network processing device 108 may be any known type of network processing device, such as a router, network switch, and/or an intelligent network adapter.

In accordance with an illustrative embodiment, sources 104 may include data queues 110. In this case, as well as in other illustrative embodiments, work 102 may include data packets 112, such as data packets 112 on queues 110. Data packets 112 comprise, for example, data traffic flowing through network processing device 108.

In accordance with an illustrative embodiment, sinks 106 may include a plurality of processor threads 114. For example, multiple threads 114 may be provided on multiple processor cores 116. Each of the plurality of cores 116 may provide one or more threads 114. During any particular scheduling or selection period, one or more sinks 106, such as one or more threads 114, may be available 118. Sink 106 generally is available 118 if sink 106 is not busy processing, and thus is available to receive and process work 102 from source 104.

In accordance with an illustrative embodiment, sources 104 and sinks 106 are subject to one or more assignment constraints 120. Assignment constraints 120 define which sinks 106 may process work 102 from which sources 104. Thus, assignment constraints 120 may also be said to define which sources 104 may provide work 102 to which sinks 106.

In accordance with an illustrative embodiment, assignment constraints 120 may be implemented in qualifier matrix 122. Qualifier matrix 122 implements assignment constraints 120 such that by providing sinks 106 to qualifier matrix 122 sources 104 that are qualified to provide work 102 to such sinks 106 are identified. Similarly, sinks 106 that are qualified to receive work 102 from sources 104 are identified by providing such sources 104 to qualifier matrix 122.

In accordance with an illustrative embodiment, source scheduler 126 selects a single selected source 128 each scheduling period. Selected source 128 is the source 104 from which work 102 will be directed to a selected sink 106 for processing in a given scheduling period. Thus, source scheduler 126 may be coupled to qualifier matrix 122 to receive qualified source information and qualified sink information from qualifier matrix 122. Source scheduler 126 selects selected source 128 from among those sources 104 that have work 102 in the current scheduling period. Thus, selected source 128 is a source 104 from which work 102 may be assigned to an available 118 sink 106 in the current scheduling period.

In accordance with an illustrative embodiment, source scheduler 126 may include a hierarchical structure 130 that can process a high number of sources 104 in parallel each clock cycle by using a modular design with each module processing a subset of sources 104 to be processed. For example, hierarchical scheduler 130 may include a plurality of first level scheduler modules 132. Each first level scheduler module 132 operates preferably simultaneously in parallel with other first level scheduler modules 132 to select an intermediate selected source from a subset of sources 104. Preferably the various subsets of sources 104 processed by each first level module 132 do not overlap. The intermediate selected sources from first level modules 132 are provided to second level module 134. Second level module 134 selects a selected source 104 from the intermediate selected sources. In accordance with an illustrative embodiment, first level modules 132 and/or second level module 134 may implement their respective selections using a round robin selection process and/or structure. Thus, source scheduler 126 in accordance with the illustrative embodiment solves the problem of processing a large number of sources 104 for scheduling in one clock cycle. As parallelism is achieved with the modular design, hierarchical source scheduler 130 in accordance with the illustrative embodiment is capable of deriving a scheduling decision within the allotted scheduling period to meet high speed networking performance requirements.

In accordance with an illustrative embodiment, source scheduler 126 may implement a multi-priority scheduler 136. Multi-priority scheduler 136 allows selected source 128 to be selected from sources 104 having higher priority before being selected from sources 104 having lower priority. In accordance with an illustrative embodiment, multi-priority scheduler 136 may include a plurality of prioritized scheduler slices 138. Each scheduler slice 138 selects an intermediate selected source from a subset of sources 104. Each subset of sources 104 processed by a scheduler slice 138 has a different priority level from the priority level of the subsets processed by other scheduler slices 138. Intermediate selected sources from prioritized scheduler slices 138 are provided to selector 140. Selector 140 selects as selected source 128 the intermediate selected source from prioritized scheduler slice 138 processing the subset of sources 104 having the highest priority level.

In accordance with an illustrative embodiment, source scheduler 126 may implement dual scheduler 142. Dual scheduler 142 uses source attributes and sink attributes to assign work 102 from sources 104 to sinks 106 in a manner that achieves both assignment fairness and processing efficiency. Dual scheduler 142 includes first or basic scheduler 144 and second or complement scheduler 146.

Each scheduling period, basic scheduler 144 selects a source 104 having work to be performed based on source attributes. For example, basic scheduler 144 may select a source 104 in a manner so as to preserve assignment fairness among sources 104, such as in a conventional round robin fashion. If at least one sink 106 is available to process work 102 from the source 104 selected by basic scheduler 144, the source selected by basic scheduler 144 becomes the selected source 128, and an available sink is then selected to process work 102 from selected source 128. If no sink 106 is available to process work from the source 104 selected by basic scheduler 144, due to assignment constraints 120, basic scheduler 144 does not make another selection, but maintains its current selection for selection again during the next scheduling period. Therefore, the source 104 selected by basic scheduler 144 based on source attributes is not bypassed, and work 102 from this source 104 will be assigned to a sink 106 at the next scheduling period for which a sink 106 that is allowed by assignment constraints 120 to process work 102 from that source 104 becomes available. Thus, basic scheduler 144 provides for scheduling fairness, ensuring that all sources 104 are serviced in an order as defined by source attributes.

Complement scheduler 146 selects a source 104 for which work 102 is to be processed in any scheduling period for which the source 104 selected by basic scheduler 144 cannot be processed by an available sink 118. Complement scheduler 146 identifies one or more sinks 106 that may most efficiently process work 102 in the current scheduling period. This selection is based on one or more sink attributes related to efficiency. Based on the selected sink, complement scheduler 146 selects the selected source 128 as a source 104 that has work 102 available in the current scheduling period and that may be processed by one of the selected sinks 106, in accordance with given assignment constraints 120. Complement scheduler 146 may employ one or more source attributes in making a selection from among multiple potential sources 104 that may provide work 102 to the sinks 106 selected by complement scheduler 146, such as to maintain fairness among such potential sources 104. Thus, complement scheduler 146 enhances efficiency by ensuring that work 102 from a source 104 is provided for processing by the most efficient sink 106 in each processing period for which basic scheduler 144 cannot provide the source 104 from which work 102 is to be processed in order to maintain assignment fairness.

In accordance with an illustrative embodiment, sink scheduler 148 selects available 118 sink 106 that is qualified to receive work 102 from selected source 128. Sink scheduler 148 preferably is coupled to source scheduler 126 to receive selected source 128 and to qualifier matrix 122 to receive available 118 sinks 106 qualified to receive work 102 from selected source 128. Any desired method or structure may be used to select a qualified available 118 sink 106 from multiple qualified and currently available 118 sinks 106 for selected source 128.

In accordance with an illustrative embodiment, where sinks 106 include multiple threads 114 on multiple cores 116, sink scheduler 148 may include core scheduler 150 and thread scheduler 152. Core scheduler 150 selects a core 116 containing an available thread 114 that is qualified to receive work 102 from selected source 128. Core scheduler 150 preferably selects a core 116 based on a workload of the core 116 or another attribute indicative of core efficiency. For example, core scheduler 150 may select from among cores 116 containing available threads 114 that are qualified to receive work 102 from selected source 128 that core 116 having a smallest number or percentage of active threads 114 or a largest number or percentage of available threads 114. Thread scheduler 152 then selects a single qualified available thread 114 on the core 116 selected by core scheduler 150 using any desired method or structure.

In accordance with an illustrative embodiment, packet injector 154 is provided to provide work 102 from selected source 128 to the available 118 sink 106 selected by sink scheduler 148.

The illustration of FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, as will be discussed in more detail below, source scheduler 126 may include hierarchical 130, multi-priority 136, and/or dual 142 scheduler functions in one or more various combinations. For example, each prioritized scheduler slice 138 of a multi-priority scheduler 136 may be implemented as a hierarchical scheduler 130 having multiple first level scheduler modules 132 and second level scheduler module 134 or as a dual scheduler 142 having basic scheduler 144 and complement scheduler 146 for each priority level. As another example, dual scheduler 142 may employ a hierarchical scheduler 130 to implement basic scheduler 144 and/or complement scheduler 146, in whole or in part.

Figure 2:
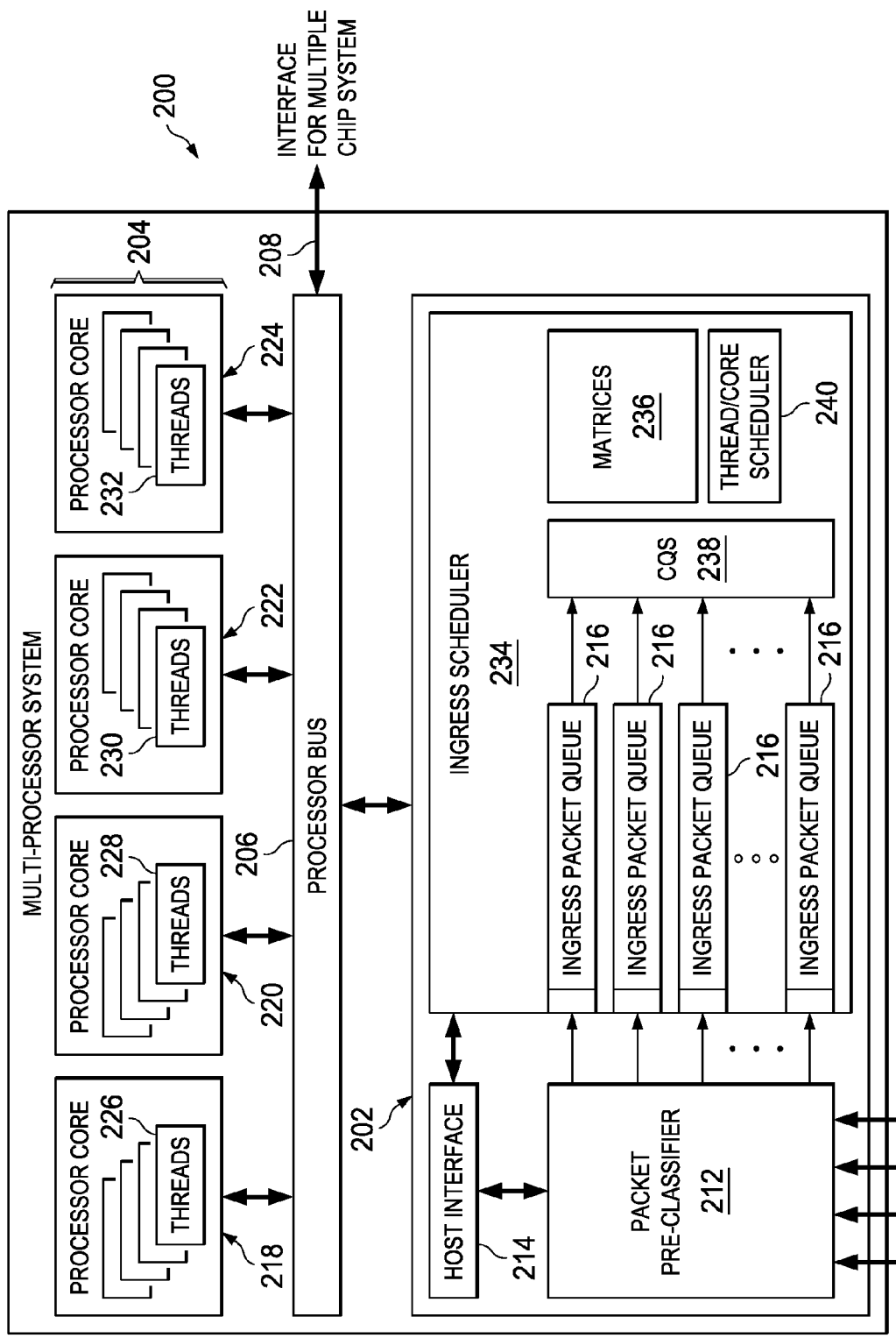
FIG. 2 is a schematic block diagram of a network processing device in which an apparatus and method for assigning work from multiple sources to multiple sinks in accordance with an illustrative embodiment may be implemented.

The block diagram of FIG. 2 shows network processing device 200 in which an apparatus and method for assigning work from multiple sources to multiple sinks in accordance with an illustrative embodiment may be implemented. In this example, network processing device 200 is an example of one implementation of network processing device 108 of FIG. 1. Network processing device 200 represents one example of an environment in which an apparatus and/or method in accordance with an illustrative embodiment may be implemented.

Network processing device 200 includes network component 202 and processing component 204. Processor bus 206 connects network component 202 to processing component 204. Processor bus 206 also provides interface 208 to other data processing units, such as to processing units on other chips where network processing device 200 is implemented as a multiple chip system.

Network component 202 sends and receives data packets via high speed network interfaces 210. Received packets are processed initially by packet pre-classifier 212. For example, packet pre-classifier 212 may partition incoming traffic into different segments for the purpose of providing network segment specific quality of service (QoS) or for some other purpose as may be defined by a user via host interface 214. Data packets sorted by packet pre-classifier 212 are directed to ingress packet queues 216. For example, one or more queues 216 may be associated with each segment into which incoming data is divided by packet pre-classifier 212.

Processing component 204 may include a plurality of processor cores 218, 220, 222, and 224. Although in the example embodiment illustrated processing component 204 includes four cores 218, 220, 222, and 224, it should be understood that network processing device 200 in accordance with an illustrative embodiment may include more or fewer cores implemented on one or more processor chips. Each of cores 218, 220, 222, and 224 may support one or more processing threads 226, 228, 230, and 232, respectively. In accordance with an illustrative embodiment, each of cores 218, 220, 222, and 224, preferably may contain any number of threads 226, 228, 230, and 232 as may be required or desired for a particular implementation.

Data packets in queues 216 are sent to threads 226, 228, 230, and 232 for processing via processor bus 206. Queues 216 are examples of sources of work. The data packets in queues 216 are examples of work to be processed. Threads 226, 228, 230, and 232 are examples of sinks for the work. In accordance with an illustrative embodiment, data packets from queues 216 are assigned to threads 226, 228, 230, and 232 for processing by scheduler 234. As will be discussed in more detail below, scheduler 234 in accordance with an illustrative embodiment includes qualifier matrix 236, source scheduler 238, and sink scheduler 240. These components provide an apparatus and method for effectively assigning packets from multiple queues 216 to multiple threads 226, 228, 230, and 232 given assignment constraints on which threads 226, 228, 230, and 232 may process work from which queues 216.

Figure 3:
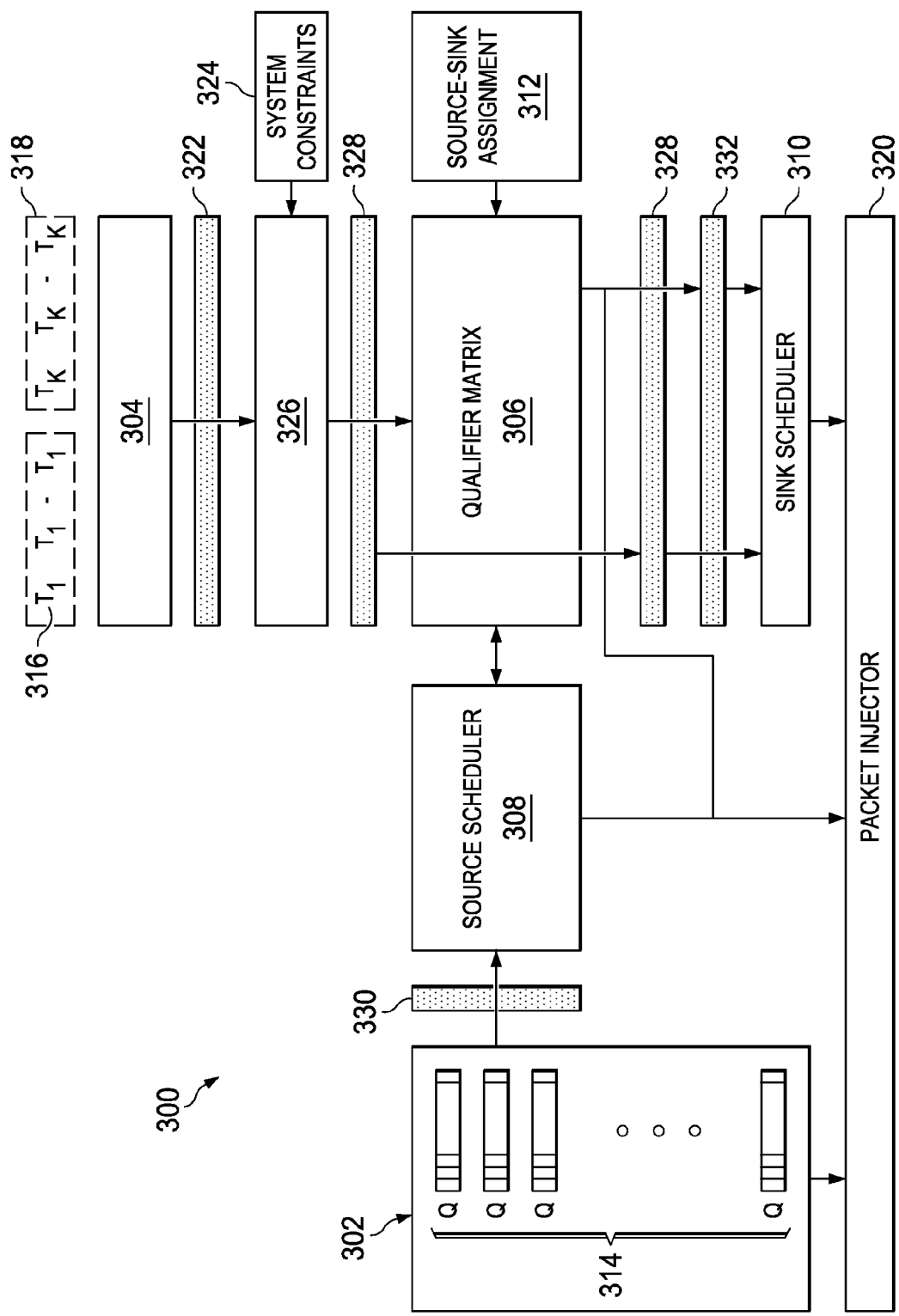
FIG. 3 is a schematic block diagram of an apparatus for assigning work from multiple sources to multiple sinks in accordance with an illustrative embodiment.

The block diagram of FIG. 3 shows scheduler apparatus 300 for assigning work from multiple sources 302 to multiple sinks 304 in accordance with an illustrative embodiment. Apparatus 300 includes qualifier matrix 306, source scheduler 308, and sink scheduler 310. In this example, qualifier matrix 306 is an example of one implementation of qualifier matrix 122 of FIG. 1 and of qualifier matrix 236 of FIG. 2. Source scheduler 308 is an example of one implementation of source scheduler 126 of FIG. 1 and of source scheduler 238 of FIG. 2. Sink scheduler 310 is an example of sink scheduler 148 of FIG. 1 and of sink scheduler 240 of FIG. 2.

The assignment of work from sources 302 to sinks 304 is subject to a set of assignment constraints 312. Each source 302, for example, a data queue 314, is associated with a set of sinks 304, for example, working threads 316, that are allowed to work on work from said source 302. When a particular sink 304 is not busy it declares itself available and ready to process new work, such as a new data packet. This logically makes all sources 302 that contain the available sink 304 in their worker set eligible in the next scheduling period to be selected to provide work to sink 304. Qualifier matrix 306 captures this eligibility relationship and hence maps the set of ready or available sinks 304 to a set of qualified sources which is presented to source scheduler 308. Source scheduler 308 selects from the overlap of all qualified and non-empty sources 302 the next source 302 to provide the next work in accordance with an internal source scheduler algorithm. Once a source 302 is selected, sink scheduler 310 determines the most appropriate sink 304 to execute the work. Where the sink 304 is a thread 316 executing on a core 318, sink scheduler 310 may first determine the most appropriate core 318 to execute the work based on the workload of the core 318. Sink scheduler 310 then selects the next thread 316 on that selected core 318 to receive the work. Finally, the next work from the source 302 selected by the source scheduler 302 is sent to the sink 304 selected by sink scheduler 310 by, for example, packet injector 320. The selected sink 304 is declared busy and the next scheduling cycle commences.

Scheduler 300 supports a finite set of sinks 304. In this example it is assumed that sinks 304 are processing elements of an apparatus comprised of a plurality of cores 318. Each core 318 is comprised of a set of threads 316. Each thread 316 shares underlying core resources with other threads 316 of the same core 318. As a result of the sharing of processor resources, such as pipeline, cache, translation lookaside buffer (TLB), etc., among threads 316 of a single core 318, it is desirable to dispatch work to the core 318 that is least loaded with running threads 316. Threads 316 that are idle consume fewer resources, for example, in the processor pipeline, than threads 316 that are active. So the number of running threads 316 in core 318 is an indication of how busy that core 318 is.

Scheduler 300 also supports a finite set of sources 302. In this example sources 302 are data queues 314. Associated with each source 302 are assignment constraints defined by source-sink assignment mask 312. Source-sink assignment mask 312 indicates which sinks 304 are in general allowed to handle work from which sources 302. For example, source-sink assignment mask 312 may be implemented such that a bit vector is provided for each supported source 302 with a bit of the bit vector provided for each supported sink 304. A bit of the bit vector may be set if a particular sink 304 is in general allowed to handle work from a particular source 302. In accordance with an illustrative embodiment, the source-sink assignment constraints defined by source-sink assignment mask 312 may be set or changed at any time. In most cases, however, the assignment constraints defined by source-sink assignment mask 312 are defined at a configuration and setup time of scheduler apparatus 300.

The assignment constraints defined by source-sink assignment mask 312 are implemented in qualifier matrix 306. Qualifier matrix 306 is essentially a copy of source-sink assignment mask 312. Qualifier matrix 306 is a two dimensional matrix having a row (or column) for each supported source 302 and a column (or row) for each supported sink 304. Thus, in accordance with an illustrative embodiment, qualifier matrix 306 may be used to determine which sources 302 are qualified to send work to a given sink 304 and which sinks 304 are qualified to receive work from a given source 302.

In an illustrative embodiment, qualifier matrix 306 may be implemented using multiple qualifier sub-matrixes as disclosed in U.S. Patent Application entitled Assignment Constraint Matrix for Assigning Work from Multiple Sources to Multiple Sinks filed on even data herewith and assigned to the assignee of the present application, the details of which are incorporated herein by reference.

When a sink 304 is ready for work it announces its "readiness" or availability. Notification of sink availability may be achieved by providing sink ready mask 322 having a "ready" bit corresponding to each supported sink 304. When a sink 304 is available and ready for work, the corresponding "ready" bit in the sink ready mask 322 is set. One way of achieving setting such a bit where sink 304 is a thread 316 on a core 318 is through memory-mapped input/output (MMIO) operations. The ready thread 316 may then optionally go to sleep, for example, through memory wait operations, to reduce its footprint on core 318 resources.

Optionally, one or more various system constraints 324 also may affect which sinks 304 are available to perform work in any given scheduling period. For example, system constraints 324 may dictate that certain sinks 304 are declared never to participate in a scheduling decision. System constraints 324 may be implemented in system constraints mask 326.

All sinks 304 that are available for work in the current scheduling period, that is, all sinks to which work can be dispatched, may be determined based on sinks 304 that have indicated that they are ready for work in the sink ready mask 322 and any other system constraints 324 that may affect sink 304 availability as defined by system constraint mask 326. The resulting set of available sinks 304 may be referred to as sink pressure 328. Sink pressure 328 may be provided in the form of a sink pressure bit vector having a bit corresponding to each supported sink 304, wherein a sink pressure bit for a particular sink 304 is set if that sink 304 is determined to be available for work.

All supported sources 302 that have work available to be performed are determined. The resulting set of sources 302 that have work to be performed may be referred to as the source pressure 330. Source pressure 330 may be provided in the form of a bit vector having a bit corresponding to each supported source 302, wherein a source pressure bit for a particular source 302 is set if the source 302 is determined to have work available to be performed. As a result, a source 302 changing status from or to empty or not-empty requires that only a single bit value be switched.

The next source 302 for which work is to be performed in a given scheduling period is selected by source scheduler 308 by selecting one source 302 from among those that have work to be performed as indicated source pressure bit vector 330. Source scheduler 308 may make this selection based on any scheduling method or algorithm for selecting the most appropriate source 302 from among the eligible sources 302. For example, in accordance with an illustrative embodiment, source scheduler 308 may make this selection using a dual scheduler as disclosed herein to maintain fairness and to improve efficiency. The selected source 302 may be indicated in selected source bit vector 332 having a bit for each supported source 302 and wherein one selected source bit corresponding to the selected source 302 is set.

A sink 304 to which work from the selected source 302 is to be assigned is selected. In accordance with an illustrative embodiment, where sinks 304 include multiple threads 316 on multiple cores 318, sink 304 selection preferably includes first determining a core 318 to which the work from the selected source 302 is to be dispatched by sink scheduler 310 based on the selected source 302, as indicated in selected source bit vector 322, and thread pressure 328 indicating available threads 316. For example, to determine a core 318 to which work is to be dispatched, eligible threads 316 to which work from the selected source 302 may be directed may be determined by an AND operation of corresponding bits of source-sink assignment mask 312, indicating threads 316 allowed to perform work for the selected source 302, and thread pressure 328, using qualifier matrix 306. The result may be provided as a thread-schedulable mask in the form of a bit vector having a bit corresponding to each supported thread 316, wherein a thread-schedulable bit for any particular supported thread 316 is set if it is determined that work may be dispatched from the selected source 302 to that thread 316. The determined eligible threads 316 may be used to determine eligible cores 318 by multiplexing the thread-schedulable mask into a core bit of a core eligibility mask. A core 318 is eligible if any of the eligible threads 316 belong to that core 318. The core eligibility mask includes a bit vector having a bit corresponding to each of the system cores 318, wherein a core eligible bit corresponding to a particular core 318 is set if the bit for any of its threads 316 is set in the thread-schedulable mask. One of the eligible cores 318 is selected to receive work from the selected source 302, preferably based on core workload considerations. For example, an eligible core 318 that has the most idle, or largest proportion of idle, threads 316 may be selected. Alternatively, some other workload based or other criteria may be used to select a core 318 from among determined eligible cores 318.

Having selected a core 318, one of the available threads 316 on the core 318 that is allowed to perform work for the selected source 302 is selected to receive work from the selected source 302 by sink scheduler 310 by selecting a thread 316 from the selected core 318 for which the thread-schedulable bit in the thread-schedulable mask is set. Any desired criteria and method may be used to select from among selectable threads, such as using a round robin selection process.

Work is retrieved from the selected source 302 and dispatched to the thread 316 that has been selected as the sink 304 to work on it by packet injector 320. Packet injector 320 may, for example, notify the selected thread 316 that it has been selected to receive a work packet. This notification may be provided via a memory touch, if the thread 316 was waiting on a memory location. The selected thread 316 may then be marked as busy. This may be accomplished by clearing the ready bit for this thread in sink ready mask 322.

Qualifier matrix 306 and sink scheduler 310 may be implemented with multiplexers and bit masking to operate in one cycle. Source scheduler 308 may require more complex implementation.

Figure 4:
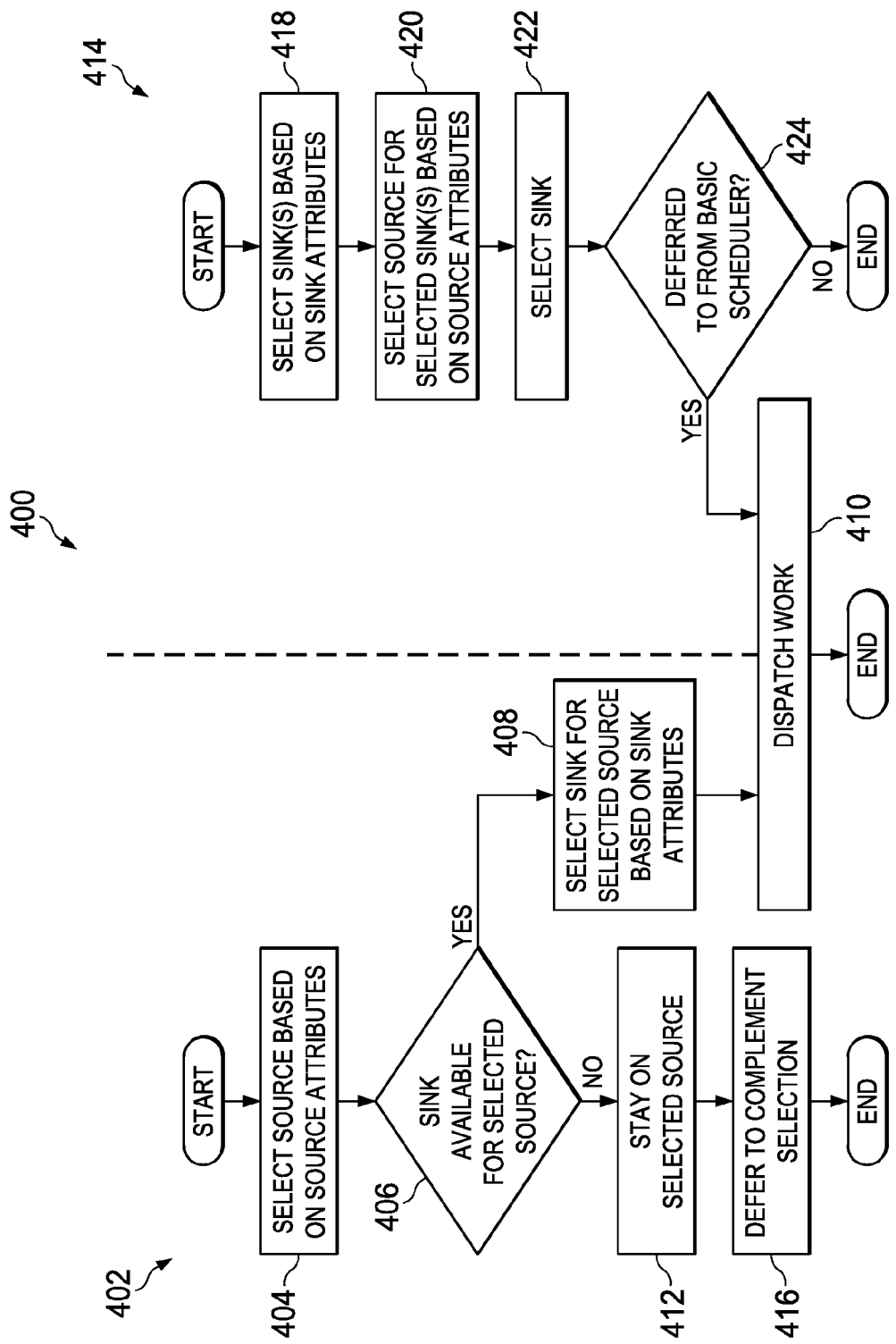
FIG. 4 is a flow chart diagram showing steps of a method for assigning work from multiple sources to multiple sinks using dual scheduling in accordance with an illustrative embodiment.

The flow chart diagram of FIG. 4 shows steps of method 400 for making a scheduling decision in accordance with an illustrative embodiment. Method 400 may be implemented by scheduler 126 of FIG. 1, and more particularly by dual scheduler 142 of FIG. 1. Method 400 may be implemented in the scheduler apparatus 300 of FIG. 3, or in a similar or entirely different apparatus.

For each scheduling period, method 400 selects a source for which work is to be processed by using basic scheduler process 402. Basic scheduler process 402 selects a source for which work is to be processed based on source attributes (step 404). In other words, step 404 includes selecting a source based solely on attributes related to the source, such as the source having work available to be performed. For example, to maintain fairness among sources, step 404 may include selecting a source from among sources having work to be performed in a conventional round robin fashion. Other source attributes that may be considered in step 404 to maintain fairness among sources may include static attributes, such as tenure related to source priority or other factors, and dynamic attributes, such as the amount of time that a source has been waiting to be serviced and/or the amount of work that a source has to be processed. Step 404 does not take into account attributes of the system sinks, such as whether or not a sink is available to process work from any given source.

It is then determined whether a sink is available to process work from the selected source (step 406). Step 406 includes determining which sinks may process work from the selected source given any assignment constraints and whether any of these sinks are currently available. If at least one sink is determined in step 406 to be available to process work from the selected source, one of the available sinks is selected to receive the work from the selected source in the current scheduling period (step 408). Step 408 may include selecting one sink from among the available sinks that may process the work from the selected source based on sink attributes related to efficiency. For example, where the sinks are threads operating on cores, step 406 may include choosing a thread based on static thread or core attributes, such as the size of the cache available to a thread or core, and/or based on dynamic attributes, such as the number of currently busy threads on a core, actual cache occupancy, etc. Fairness is guaranteed by basic scheduler process 402 by selecting a source based on source attributes related to fairness alone. This fairness is not modified by the subsequent selection of a sink in step 408 that takes into account efficiency considerations, but efficiency is increased if the sink selection is based on such efficiency considerations. Work from the selected source may then be dispatched to the selected sink (step 410). Step 410 completes the scheduling process 400 for the current scheduling period.

If the source selected in step 404 has work to be performed, but there is no sink available to perform the work from this source, the next source with work to be performed and having a sink available to perform the work might be selected. However, bypassing the initially selected source in this manner does not maintain fairness. Furthermore, merely selecting another source does not optimize global system efficiency, even when the work is dispatched to the most efficient sink currently available to process work from the selected source. Since sources are selected in basic scheduler process 402 based on source attributes alone, the sinks available to process work from any source selected by basic scheduler process 402 may be less efficient than other system sinks that are currently available, but that may not be able to process work from the selected source due to assignment constraints.

In accordance with an illustrative embodiment, in response to determining at step 406 that no sink currently is available for the selected source, instead of selecting another source with work to be performed, basic scheduler process 402 does not advance and stays with the selected source (step 412). Thus, step 412 ensures that the source selected in step 404 will be selected again by base scheduler process 402 the next scheduling period, and will continue to be selected by base scheduler process 402 until a sink becomes available to process work from the selected source. In the case where base scheduler process 402 does not select a source from which work can be processed in a given scheduling period, base scheduler process 402 defers to complement scheduler process 414 for selecting a source from which work may be provided to an available sink in that scheduling period (step 416). Step 416 completes basic scheduling process 402 for the current scheduling period.

Complement scheduler process 414 begins by selecting one or more sinks based on desirable sink attributes (step 418). Step 418 may include selecting one or more sinks that are currently available to process work from any source based on sink attributes related to processing efficiency. For example, where the sinks are multiple threads operating on multiple cores, the sink attributes employed in step 418 may include static attributes, such as the size of the cache available to a thread or core, and/or dynamic attributes, such as the number of currently busy threads on a core, actual cache occupancy, etc. Since fairness is provided among sources by basic scheduler process 402, step 418 may make a sink selection based entirely on efficiency considerations related to sink attributes, and without regard to any fairness or other considerations related to source attributes.

Complement scheduler process 414 then selects a single source having work to be performed and that, in accordance with any assignment constraints, may provide that work to a sink selected in step 418 (step 420). Step 420 may include selecting a single source from among several sources that may have work that may be processed by the one or more selected sinks based on one or more source attributes. Such source attributes may include, for example, static attributes, such as tenure related to source priority or other factors, and dynamic attributes, such as the amount of time that a source has been waiting to be serviced or the amount of work that a source has to be processed. Use of such source attributes may introduce some fairness into the complement scheduler process 414, which bases its selection initially on efficiency considerations related to sink attributes alone. Use of such source attributes for source selection in step 420 does not modify the efficiency which is guaranteed at the system level by selecting the most efficient sink in step 418, but may increase fairness if the source selection is made using source attributes such as tenure, amount of work that the source has to be processed, or the like.

Multiple sinks, such as multiple sinks having the same level of efficiency, may have been selected in step 418. Thus, the source selected in step 420 may have available more than one of the sinks selected in step 418 to which work from the source may be dispatched. In this case, one sink is selected from among the sinks selected in step 418 that may, in accordance with any assignment constraints, process work from the source selected in step 420 (step 422). Step 422 may include any process for selecting a single sink from among candidate sinks, such as using a simple round robin process. Alternatively, step 422 in complement scheduler process 414 may include the same process employed in step 408 in basic scheduler process 402.

It is determined in complement scheduler process 414 whether or not basic scheduler process 402 has deferred to the selections made by complement scheduler process 414 in the current scheduling period (step 424). When it is determined in step 424 that basic scheduler process 402 has deferred to complement scheduler process 414 in the current scheduling period, work from the source selected in step 420 is dispatched to the sink selected in step 422 in step 410. As mentioned above, step 410 completes method 400 for the scheduling period. Complement scheduler process 414 is completed for the scheduling period when it is determined in step 424 that basic scheduler process 402 has not deferred to complement scheduler process 414 in the current scheduling period.

The use of basic scheduler process 402 in combination with complement scheduler process 414 in method 400 optimizes the balance between efficiency and fairness in selecting a source from among multiple sources having work to be processed and selecting a sink from among multiple sinks that may process work from the selected source in any given processing period. In accordance with the illustrative embodiment, basic scheduling process 402 selects a source from among sources having work available in order to maintain fairness with respect to the sources, even if there is no sink currently available to process work from the selected source. Complement scheduler process 414 improves efficiency by giving priority to more efficient sinks, before selecting the source from which work is to be processed.

Dual scheduling in accordance with an illustrative embodiment may be implemented in a high performance packet dispatcher for handling 10 Gbps, 40 Gbps, or even 100 Gbps packet traffic. In this case, scheduling in accordance with an illustrative embodiment may not be implemented using finite state machines performing selections, e.g., the queue selection, the core selection, and the thread selection, one after the other, based on observations of scheduling elements performed each scheduling period. In accordance with an illustrative embodiment, the selection functionality preferably is split among separate entities, implemented using logic circuitry, in order that each selection may be completed in one selection cycle.

In accordance with an illustrative embodiment, the sources may be a plurality of data queues, the work includes data packets on the plurality of data queues, and the plurality of sinks are a plurality of processor threads adapted to process the data packets. The threads may be independent, served by different queues and even different priority planes. Thus, the scheduling selection of selecting a sink in the basic scheduler may not follow the flow of choosing the least loaded core first and then choosing a thread inside this less loaded core. In accordance with an illustrative embodiment, thread selection by the basic scheduler may be made in a first cycle without regard to total core load or weight. Later, in another cycle, the core weight may be applied to select the best core. In another cycle a thread in the best core may be selected.

In accordance with an illustrative embodiment, a mechanism may be provided to select a queue in which packets are pre-classified. This mechanism may be composed of different sets of queues arranged in different sets of priorities, comprising information on each queue status and a remembrance of a last selected queue. When a queue is selected, another mechanism selects all threads that are eligible, i.e., all threads that are not busy and that are not masked for the queue by any assignment constraints. This mechanism may include a set of mask bits per queue, with each bit defining the ability of a given thread to handle traffic from the queue, and a separate mechanism indicating whether a given thread is busy or free. Examples of these mechanisms are described above with reference to FIG. 3. The selection of threads may then be performed by logic circuitry looking at the information provided by the described mechanisms in parallel, thus making a selection decision in one propagation time of one system clock cycle through the logical circuits.

In accordance with an illustrative embodiment, a mechanism may be provided which computes a "weight" for each core based on the number of free threads in a given core. Core weight preferably is calculated without regard to the queue or priority plane that has fed the core threads. A mechanism is provided which then selects only one core from among all of the threads that have been selected by the mechanism described above using the weight of each core and selecting the core with the highest weight. This mechanism may include logic circuitry for applying the core weight on the relevant threads and logic circuitry selecting the core with the highest weight. The selection of the core thus may be made by logic circuitry looking at all of the necessary information in parallel, and making the decision in one propagation time of one system clock cycle through the logic circuits.

In accordance with an illustrative embodiment, a mechanism for selecting a thread in the selected core may include logic circuitry applying the previous thread selection remembrance and logical circuitry for selecting the thread in round robin fashion. The selection of the thread thus may be made by logic circuitry looking at all of the necessary information in parallel and making the decision in one propagation time of one system clock cycle through the logic circuits.

In another illustrative embodiment, a mechanism may be provided such that at least one thread can reserve a core for itself, with the property that if all of the cores corresponding to the eligible threads have at least one thread reserving the core, then any core can be selected.

In a complement scheduler in accordance with an illustrative embodiment, a core is selected before a queue is selected. The selected core preferably is the least loaded core that has at least one thread that is free and that is eligible to handle traffic coming from any or all of the queues. In accordance with an illustrative embodiment, such core selection preferably is performed by logic circuitry looking at all necessary information in parallel and making the core selection decision in one propagation time of one system clock cycle through these logic circuits.

In accordance with an illustrative embodiment, each core may advertise its weight on a global weight line that is provided to all other cores. Each core checks it own weight against the weight of other cores as provided on the weight lines. If the core has the weight indicating that it is least loaded it is the winner and is selected. Several cores with the same weight may be winners and selected.

Any queue belonging to a selected core can now be selected. This queue selection may be performed using a round robin process using remembrance of the last queue selected by the complement scheduler. This queue selection also may be performed by selecting the queue with the maximum of fairness employing circuitry which will make the selection in one cycle. Thus, the selection of the queue by the complement scheduler may be accomplished by logic circuitry looking at all necessary information in parallel and making the decision in one propagation time of the system clock through the logic circuits.

After the queue is selected, a thread may be selected using the mechanisms described above with respect to thread selection by the base scheduler. In this case, the same logic circuitry that is used for core selection by the base scheduler may be used to select from among several selected cores having the same weight.

Thus, in accordance with an illustrative embodiment, basic and complement scheduling may be implemented using logic circuitry in a manner that provides for dual scheduling for very high speed packet throughput. Basic and complement circuitry in accordance with an illustrative embodiment may run in parallel to always provide a queue and thread selection decision in the same scheduler running time period. This period cannot be longer than 6 ns in order to be able to make a decision on each packet received, for example, on a 100 Gbps Ethernet line. This time constraint calls for the use of logic circuitry as described, for the selection of queues, cores, and threads, working in parallel, with one working cycle for each selection decision, providing a very few cycles, e.g., 6 cycles total with a 1 GHz technology where the size of the smallest 100 Gbps Ethernet packet is 6 ns.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and explanation, but is not intended to be exhaustive or limited to the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. A method of assigning work from a plurality of sources to a plurality of sinks in a scheduling period, the method comprising:

selecting, by a data processing system using a first scheduler, a first source from the plurality of sources in a current scheduling period based on a source attribute that maintains source selection fairness among the plurality of sources;

determining, by the data processing system, whether a sink is available for the first source in the current scheduling period based on work assignment constraints between the plurality of sources and the plurality of sinks that define which of the plurality of sinks are associated with which of the plurality of sources to process work from;

responsive to determining that a sink is available for the first source in the current scheduling period based on the work assignment constraints, selecting by the data processing system, a first sink for the first source in the current scheduling period based on the assignment constraints; and responsive to determining that a sink is not available for the first source in the current scheduling period based on the work assignment constraints, staying, by the data processing system, on the first source by making another source selection using the first scheduler such that the same first source is selected as the first source by the first scheduler in a next scheduling period, deferring, by the data processing system, source selection in the current scheduling period from the first scheduler to a second scheduler, selecting, by the data processing system, a second sink from the plurality of sinks in the current scheduling period based on a sink attribute that relates to work processing efficiency, and selecting, by the data processing system using the second scheduler, a second source for the second sink in the current scheduling period based on the assignment constraints.

2. The method of claim 1, wherein selecting the first source includes selecting the first source from the plurality of sources using a round robin selection process.

3. The method of claim 1, wherein the source attribute includes at least one source attribute selected to maintain the source selection fairness in selecting a first source from the plurality of sources.

4. The method of claim 3, wherein the source attribute includes at least one source attribute selected from a group of source attributes consisting of tenure related to source priority, an amount of time since a source was serviced by a sink, and an amount of work that the source has to be processed.

5. The method of claim 1, wherein selecting a first sink includes selecting a first sink for the first source based on the source attribute related to sink processing efficiency of work.

6. The method of claim 1, wherein the sink attribute includes at least one attribute related to sink processing efficiency of work.

7. The method of claim 6, wherein the sink attribute is selected from a group of sink attributes consisting of cache size, cache occupancy, and a number of busy threads on a processor core.

8. The method of claim 1, wherein selecting a second sink includes selecting the second sink based on the sink attribute related to sink processing efficiency of work.

9. The method of claim 1 further comprising:
responsive to determining that a sink is available for the first source in the current scheduling period based on the work assignment constraints, dispatching, by the data processing system, work from the first source to the first sink; and
responsive to determining that a sink is not available for the first source in the current scheduling period based on the work assignment constraints, dispatching, by the data processing system, work from the second source to the second sink.

10. The method of claim 1, wherein:
the plurality of sources are a plurality of data queues;
the work includes data packets on the plurality of data queues; and
the plurality of sinks are a plurality of processor threads that process the data packets.

11. A data processing system for assigning work from a plurality of sources to a plurality of sinks in a scheduling period, the data processing system comprising:
one or more processor cores that include the plurality of sinks;
a first scheduler; and
a second scheduler;
wherein the first scheduler selects a first source from the plurality of sources in a current scheduling period based on a source attribute that maintains source selection fairness among the plurality of source, determines whether a sink is available for the first source in a current scheduling period based on work assignment constraints between the plurality of sources and the plurality of sinks that define which of the plurality of sinks are associated with which of the plurality of sources to process work from, selects a first sink for the first source in the current scheduling period based on the assignment constraints in response to determining that a sink is available for the first source in the current scheduling period based on the work assignment constraints, and stays on the first source by not making another source selection such that the same first source is selected as the first source by the first scheduler in a next scheduling period and defers source selection in the current scheduling period to the second scheduler in response to determining that a sink is not available for the first source in the current scheduling period based on the work assignment constraints; and
wherein the second scheduler selects a second sink from the plurality of sinks in the current scheduling period based on a sink attribute that relates to work processing efficiency and selects a second source for the second sink in the current scheduling period based on the assignment constraints.

12. The data processing system of claim 11, wherein the first scheduler includes a round robin scheduler for selecting the first source from the plurality of sources.

13. The data processing system of claim 11, wherein the source attribute includes at least one source attribute selected to maintain the source selection fairness in selecting a first source from the plurality of sources.

14. The data processing system of claim 13, wherein the source attribute includes at least one source attribute selected from a group of source attributes consisting of tenure related to source priority, an amount of time since a source was serviced by a sink, and an amount of work that a source has to be processed.

15. The data processing system of claim 11, wherein selecting a first sink includes selecting the first sink for the first source based on a source attribute related to sink processing efficiency of work.

16. The data processing system of claim 11, wherein the sink attribute includes at least one attribute related to sink processing efficiency of work.

17. The data processing system of claim 16, wherein the sink attribute is selected from a group of sink attributes consisting of cache size, cache occupancy, and a number of busy threads on a processor core.

18. The data processing system of claim 11, wherein selecting a second sink includes selecting the second sink based on the sink attribute related to sink processing efficiency at work.

19. The data processing system of claim 11, wherein:
the plurality of sources are a plurality of data queues;
the work includes data packets on the plurality of data queues; and
the plurality of sinks are a plurality of processor threads that process the data packets.

20. The data processing system of claim 19 further comprising:
a packet injector that dispatches work from the first source to the first sink when the first scheduler does not defer to the second scheduler and to dispatch work from the second source to the second sink when the first scheduler does defer to the second scheduler.

* * * * *